United States Patent Office 3,563,103
Patented Feb. 16, 1971

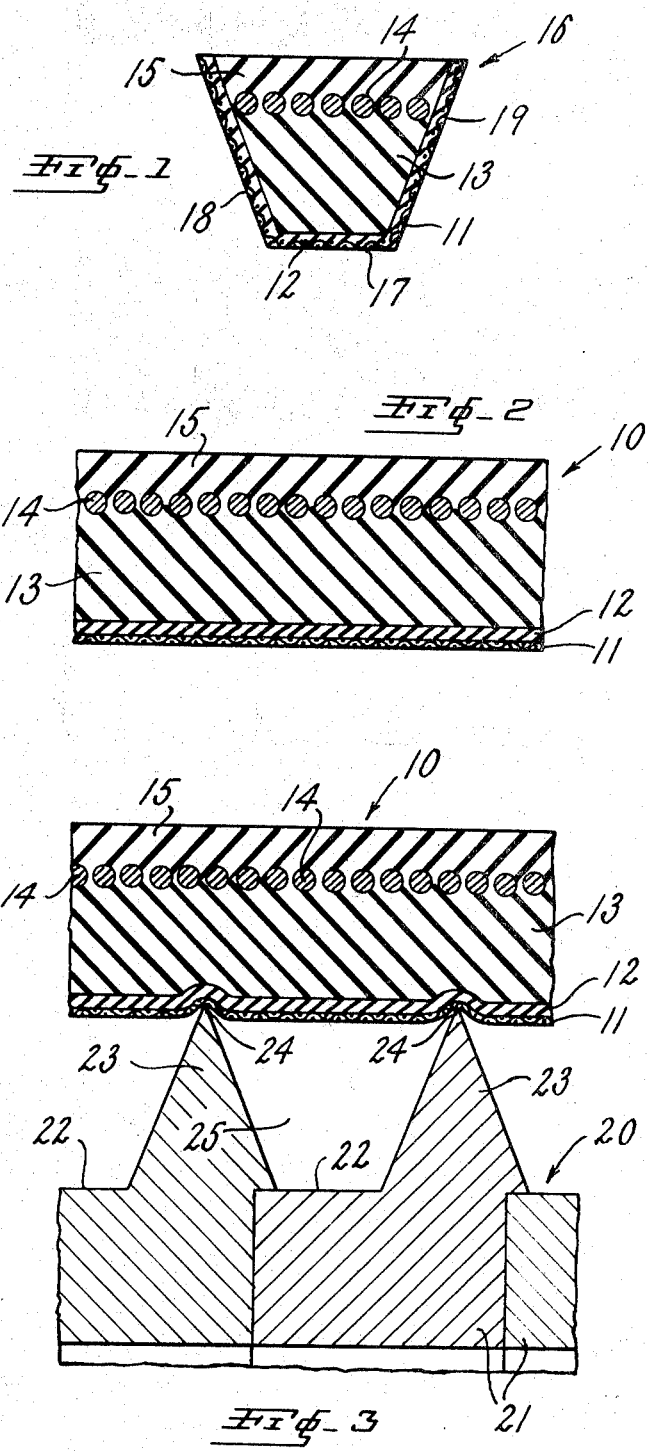

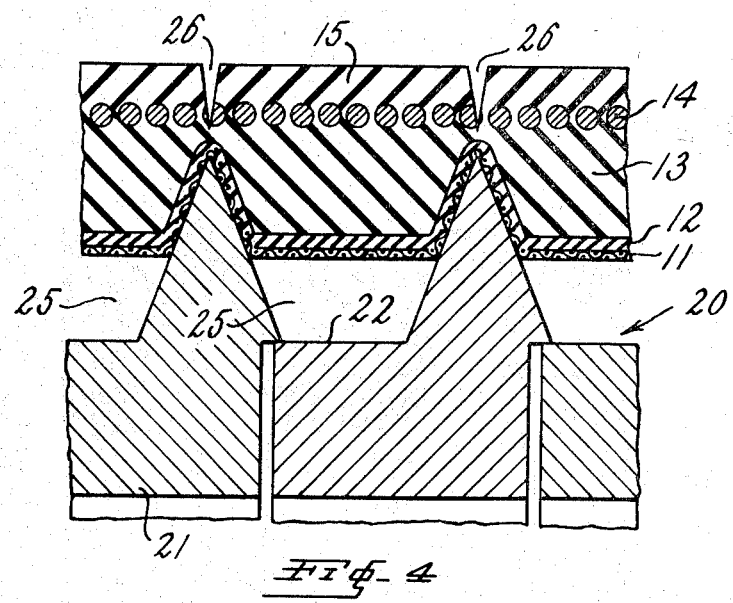
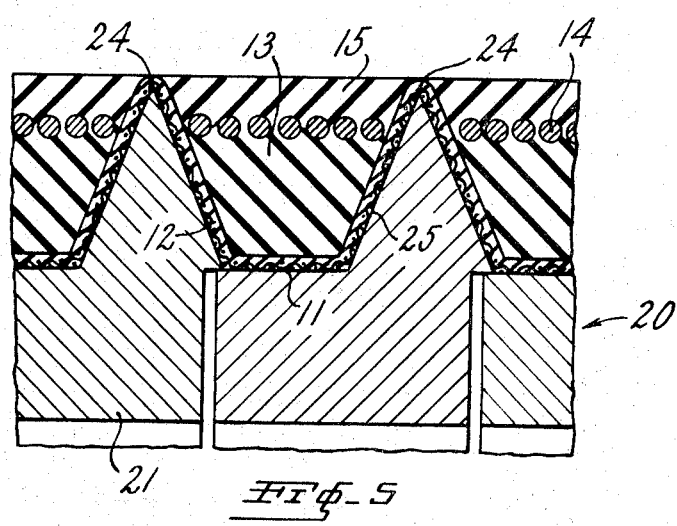

3,563,103
TRANSMISSION BELT
Herman C. Sauer, Ambler, Pa., assignor to Uniroyal, Inc., a corporation of New Jersey
Original application May 20, 1966, Ser. No. 551,735. Divided and this application Apr. 18, 1969, Ser. No. 836,187
Int. Cl. F16g 5/08
U.S. Cl. 74—233
2 Claims

ABSTRACT OF THE DISCLOSURE

A new V-belt construction is disclosed wherein a layer of special rubber having different physical characteristics from the rubber forming the body of the V-belt is positioned between the body and a wear resistant fabric. The specialty rubber extends into the interstices of the fabric.

---

This is a division of application Ser. No. 551,735, filed May 20, 1966, now abandoned.

This invention relates to V-belts and, more particularly, to a new V-belt construction and methods for making the new construction.

Copending United States patent application Ser. No. 419,092 filed by the applicant on Dec. 17, 1964, now Pat. No. 3,477,895, describes and claims a unique method for making a plurality of V-belts from a single cylindrically shaped belt carcass or slab. The method accomplishes the formation and curing of the individual belts, with jacket fabric on at least the bottom and sidewalls thereof, without the necessity of separating the belts prior to the completion of the forming and curing operations. Because of the unique method of belt formation, the fabric usable with the above-mentioned invention must be stretchable, both longitudinally and transversely, so that it will conform to the contour of the V-belt molds.

Prior to the present invention, it was necessary to subject the stretchable fabric to various treating operations to impart surface qualities to the fabric which were desirable in the finished belts. For example, it is very desirable that the pulley-engaging surface of a V-belt be static conductive and, therefore, it was necessary to treat the fabric with a suitable static conductive coating. Other prior fabric treatment was performed to provide abrasion and/or oil resistance.

Because of the great stretchability of the jacket fabric, which often exceeds 200%, the handling and treating of the fabric was a very difficult and costly operation.

Accordingly, it is an object of this invention to provide a new V-belt construction that is of superior quality and that can be more inexpensively manufactured.

A further object is to provide a method for making a new V-belt construction wherein the jacket fabric on said belt does not require pre-treatment.

A still further object is to provide a method for uniformly applying a layer of specialty rubber to the bottom walls and side walls of a V-belt.

Another object is to provide a method for making a V-belt static conductive.

The above and other objects are accomplished in accordance with this invention which comprises a V-belt having an endless elastomeric body portion with a top wall, a bottom wall, and two side walls; a jacket fabric covering at least the bottom wall and side walls; and a layer of specialty rubber between the body portion and the fabric and extending into the interstices of the fabric.

The method of making the new V-belt construction comprises the steps of providing an endless belt carcass or slab having at least an inner layer of stretchable fabric, a layer of body rubber, and a layer of specialty rubber intermediate the fabric and the body rubber; placing the carcass adjacent a mold having a plurality of belt molding grooves, the fabric layer being in contact with the mold; forcing the fabric, the specialty rubber and the body rubber into the grooves; whereby, the specialty rubber is embedded in the interstices of the fabric to form a layer of specialty rubber intermediate the fabric and the body rubber on at least the bottom wall and side walls of the belts.

For a better understanding of the present invention together with other and further objects thereof, reference is made to the following description, taken in connection with the accompanying drawings, and its scope will be pointed out in the appended claims.

Referring now to the drawings:

FIG. 1 is a sectional view of the new V-belt construction of the present invention;

FIG. 2 is a fragmentary sectional view of a belt carcass used in the construction of the V-belt shown in FIG. 1;

FIG. 3 is a fragmentary sectional view of a mold with a belt carcass shown in the initial molding position;

FIG. 4 is a fragmentary sectional view showing the mold and cascass of FIG. 3 during a subsequent molding operation; and FIG. 5 is a fragmentary sectional view showing the mold and completely molded V-belt sections.

As stated above, the primary function of the present invention is to eliminate the necessity of having to treat the stretchable fabric which ultimately forms the jacket fabric for the bottom and side walls of the new V-belt construction. A cylindrically shaped belt carcass is formed in a manner substantially identical to that described in the aforementioned patent application Ser. No. 419,092 with the various carcass components being applied onto an expansion mandrel. The main difference is that the jacket fabric may be applied directly to the mandrel without pre-treatment, thus eliminating the very costly and time consuming fabric treating operations.

Referring to FIG. 2, a fragmentary section of portion of a belt carcass is illustrated. Prior to molding, the belt carcass shown generally at 10 is cylindrically shaped and is made up of a plurality of layers of the various belt components.

The layer of stretchable fabric 11 is first applied to an expansion mandrel (not shown) so that it will form the innermost layer of belt slab 10. The construction of fabric 11 is not critical, however, certain minimum requirements must be met. Since the fabric must be stretchable both longitudinally and transversely, the material preferred for this invention is a knitted nylon jacket material, style number 1290, which, in an untreated condition, has a 229% stretch in the transverse direction and a 113% stretch in the longitudinal direction. The gauge of the fabric is 0.014 inch in the unstretched condition. The minimum amount of stretch for jacket fabric 11 will vary according to the size and type of belts being manufactured, however, the above-described fabric has been found to be adequate for all belt sizes.

A relatively thin layer of specialty rubber 12 is next applied to the mandrel directly over fabric 11. The term "specialty rubber" as used in this specification is intended to include all types of rubber, both natural and synthetic, and other elastomeric material suitable for use in this type of molding operation. Fabric 11 will ultimately be embedded in the layer of specialty rubber 12 and the characteristics or qualities of the rubber will be imparted to the outermost surface of the bottom wall and side walls of the new belt construction. For example, if it is desired to render the pulley engaging surfaces of the V-belt static conductive, specialty rubber 12 may be a specially compounded rubber having the desired conductivity. An example of such a rubber compound is set forth below:

| Ingredients: | Parts |
| --- | --- |
| Neozone D | 2 |
| Neoprene rubber FD | 15 |
| Neozone D | 2 |
| Maglite D | 7 |
| Vulcan XC–72 [1] | 30 |
| Stearic acid | 1 |
| Circo oil | 5 |
| Zinc oxide | 2 |
| MBTS | 1 |
| AC polyethylene 6 | 2 |
| Total | 150 |

[1] Vulcan XC–72 is the trademark for a commercially available conductive carbon back.

Although the primary function of the specialty rubber set forth above is to render the V-belt static conductive, it will be appreciated that other ingredients may be added to the above formula to provide further advantages for the V-belt, or entirely different formulations may be used to impart desirable characteristics to the bottom wall and the side walls of the V-belt. For example, it may be desirable to provide an abrasion resistant and/or an oil resistant polymer for the layer of specialty rubber 12. The layer of specialty rubber, when fabric 11 is embedded therein makes it possible to eliminate any pretreatment of the fabric and imparts to the fabric the desirable qualities obtained by the treating operations used in prior methods.

The additional components of which belt slab 10 is comprised are a layer of bottom rubber 13, a layer of tension members 14, which layer usually includes a single helically wound strand or a ply (or plies) of fabric, and a layer of top rubber 15.

Referring now to FIG. 1, the new V-belt construction of the present invention is illustrated generally by numeral 16. The new construction essentially comprises the basic components described above in the description of belt carcass 10. These components are fabric 11, specialty rubber 12, bottom rubber 13, tension member 14, and top rubber 15. Fabric 11 forms a jacket fabric over the bottom wall 17 and side walls 18 and 19 of the belt. Fabric 11 is shown in FIG. 1 embedded in the layer of specialty rubber 12 which is of substantially uniform thickness over bottom wall 17 and side walls 18 and 19. It should be understood that other components may be added to the overall belt construction, such as, a layer of jacket fabric over the top wall and layers of cushion stock which are commonly added to V-belt constructions.

The method for making the new V-belt construction illustrated in FIG. 1 will now be described in detail. Since the apparatus used in the manufacturing of the belts of the present invention is identical to that described in the aforementioned copending application Ser. No. 419,092, it has not been described in detail herein.

In the formation of the individual V-belts from belt slab 10, the cylindrically shaped belt carcass is placed over the belt forming and curing mold or drum 20 (see FIGS. 3 to 5). Mold 20 is constructed from a plurality of annular mold rings 21. Each of the mold rings is provided with a circumferential surface 22 which forms the bottom wall for the endless V-belt located against said surface. Rings 21 are also provided with outwardly extending tapered ribs 23, which ribs are tapered to form a sharp edge 24 at the outermost circumference thereof and belt-molding grooves 25 are formed between the ribs.

Belt carcass 10 is placed over the sharp edges 24 and tension is applied to the carcass by a tension pulley (not shown) to slightly embed the edges in the internal, fabric covered surface of the cylindrically shaped carcass.

Referring to FIG. 4, the next operation in the formation of belts 16 is identical to that described in co-pending application Ser. No. 419,092. The helically wound layer of cords 14 are cut at spaced locations 26 in order to provide tension layers for the individual belts.

After the cord is cut and the mold rings 21 are moved to the "open" position shown in FIG. 4, additional pressure is applied by a pressure band (not shown) to the back side of belt carcass 10 while mold 20 is slowly rotated. This additional pressure forces the various belt components into grooves 25 wherein the components are molded into the desired V-belt shape.

Fabric 11 is held against transverse movement by edges 24 and the fabric stretches to assume the contour of grooves 25. The stretching of fabric 11 causes the interstices of the fabric to open and to entrap portions of specialty rubber 12 therein. Without the fabric layer over the internal surface of carcass 10, the specialty rubber 12 would have a tendency to be forced to the bottom of grooves 25 and not form a layer on the sidewalls of the individual V-belts. The entrapment of the specialty rubber 12 in the interstices of fabric 11 forms a uniform layer of the rubber over the bottom wall 17 and sidewalls 18 and 19 (see FIG. 1) of the molded V-belt 16.

Specialty rubber 12, under the force of the other belt components, also penetrates fabric layer 11 and causes the fabric to become completely embedded in the specialty rubber.

Referring to FIG. 5, the entire belt carcass is shown formed into the desired V-belt shapes within the mold grooves 25. The individual V-belts may be cured directly in the mold grooves 25 and the belts may be separated by cutting the remaining fabric which is located at the edges 24 of the mold ribs. Again, this latter operation is described in detail in copending application Ser. No. 419,092.

It will be apparent from the foregoing description, that an improved method for making individual V-belts from a V-belt carcass has been provided. This method accomplishes the manufacturing of individual V-belts having a layer of jacket fabric on at least the bottom walls and sidewalls thereof, which belts are made with an untreated fabric and a layer of specialty rubber.

The present invention provides a new V-belt construction which is made by replacing the "treated" jacket fabric with untreated fabric having a layer of specialty rubber immediately adjacent and in the interstices thereof. The above construction is accomplished by the entrapment of the specialty rubber in the jacket fabric interstices during the molding operation to effect a uniform flow of the rubber over the entire bottom wall and sidewalls of the belt.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

1. A V-belt comprising: an endless elastomeric body portion having a top wall, a bottom wall, and two sidewalls; a wear-resistant jacket fabric covering at least said bottom wall and said sidewalls; and a layer of elastomeric material more electrically conductive than said body portion intermediate said body portion and said fabric and extending into the interstices of said fabric.

2. The V-belt of claim 1 wherein said layer of conductive rubber is distributed to a uniform depth over said bottom wall and said sidewalls.

References Cited

UNITED STATES PATENTS

| 2,249,514 | 7/1941 | Berg | 74—231 |
| 2,441,945 | 5/1948 | Frolich | 74—231UX |
| 2,783,818 | 3/1957 | Kenney | 74—233 |
| 2,793,151 | 5/1957 | Arnett | 74—233X |

JAMES A. WONG, Primary Examiner